United States Patent Office.

THOMAS RESTIEAUX, OF BOSTON, MASSACHUSETTS.

*Letters Patent No. 63,749, dated April 9, 1867.*

IMPROVEMENT IN DEODORIZING PETROLEUM.

The Schedule referred to in these Letters Patent and making part of the same.

TO ALL WHOM IT MAY CONCERN:

Be it known that I, THOMAS RESTIEAUX, of Boston, in the county of Suffolk, in the Commonwealth of Massachusetts, have invented a new and improved mode of Removing, Diminishing, or Changing the Odor of Petroleum and its products; and I do hereby declare that the following is a full and exact description thereof.

The nature of my invention consists in the application of quicksilver in connection with nitric acid, muriatic acid, or a mixture of nitric acid and muriatic acid, or in any other way, to petroleum or any of the products of petroleum.

To enable others skilled in the art to make and use my invention, I will proceed to describe the operation.

I dissolve quicksilver in nitric acid, muriatic acid, or a mixture of nitric acid and muriatic acid, put the solution into the petroleum or any of the products of petroleum I wish to treat, contained in any vessel, agitate the combined liquids from time to time until the oil has become thoroughly saturated with the quicksilver solution, allow the sediment to settle, and draw off the oil. The oil may then be washed with alkali or any article having an alkaline base.

What I claim as my invention, and desire to secure by Letters Patent, is—

The application of quicksilver to petroleum and any of the products of petroleum as herein described, using for that purpose the aforesaid solution, or any other substantially the same, and which will produce the intended effect.

THOS. RESTIEAUX.

Witnesses:
    P. E. TUCKER,
    LUTHER S. LEACH.